United States Patent
Lee et al.

(10) Patent No.: US 9,911,983 B2
(45) Date of Patent: Mar. 6, 2018

(54) ELECTRODE CATALYST FOR FUEL CELL, METHOD OF PREPARING THE SAME, AND MEMBRANE ELECTRODE ASSEMBLY AND FUEL CELL, EACH INCLUDING THE SAME

(71) Applicant: Samsung Electronics Co., Ltd., Suwon-si, Gyeonggi-do (KR)

(72) Inventors: Kang-hee Lee, Suwon-si (KR); Chan-ho Pak, Seoul (KR); Dae-jong Yoo, Seoul (KR); Jun-ho Lee, Hwaseong-si (KR); Seon-ah Jin, Pocheon-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 1031 days.

(21) Appl. No.: 13/899,920

(22) Filed: May 22, 2013

(65) Prior Publication Data
US 2014/0162169 A1    Jun. 12, 2014

(30) Foreign Application Priority Data
Dec. 7, 2012  (KR) .................. 10-2012-0142317

(51) Int. Cl.
*H01M 8/10* (2016.01)
*H01M 4/90* (2006.01)
*H01M 8/1018* (2016.01)

(52) U.S. Cl.
CPC ....... *H01M 4/9083* (2013.01); *H01M 4/9016* (2013.01); *H01M 2008/1095* (2013.01)

(58) Field of Classification Search
CPC .......................... H01M 4/9083; H01M 4/9016
See application file for complete search history.

(56) References Cited

U.S. PATENT DOCUMENTS 4,131,721 A   12/1978  Fung et al.
4,263,376 A    4/1981  Blurton
(Continued)

FOREIGN PATENT DOCUMENTS

JP   2000-090952 A    3/2000
JP   2007-294332 A   11/2007
(Continued)

OTHER PUBLICATIONS

Soon Jin Oh et al., "Catalytic Hydrolysis of Phosphate Diesters by Lanthanide(III) Cryptate (2.2.1) Complexes", Inorg. Chem 1996, 35, 3780-3785 (Year: 1996).*

*Primary Examiner* — Jimmy Vo
(74) *Attorney, Agent, or Firm* — Cantor Colburn LLP

(57) ABSTRACT

A fuel cell electrode catalyst including an active complex including a cerium (Ce)-nitrogen (N) bond and having an oxygen reduction activity. Also, a method of preparing a fuel cell electrode catalyst, the method including providing a pre-catalyst including a pre-active complex having a cerium-oxygen bond; and thermally treating the pre-catalyst in the presence of a nitrogen-containing material at a temperature of from about 700° C. to about 2000° C. to prepare the electrode catalyst, the electrode catalyst including an active complex comprising a cerium-nitrogen bond. Also a fuel cell membrane-electrode assembly, the membrane-electrode assembly including: a cathode; an anode disposed opposite to the cathode; and an electrolyte membrane disposed between the cathode and the anode, at least one of the anode and the cathode including the fuel cell electrode catalyst.

19 Claims, 6 Drawing Sheets

(56) References Cited

U.S. PATENT DOCUMENTS

| | | | |
|---|---|---|---|
| 6,248,469 B1 | 6/2001 | Formato et al. | |
| 6,585,948 B1 | 7/2003 | Ryoo et al. | |
| 7,691,780 B2 | 4/2010 | Adzic et al. | |
| 7,855,021 B2 | 12/2010 | Adzic et al. | |
| 8,058,365 B2 | 11/2011 | Kawai et al. | |
| 2003/0082434 A1* | 5/2003 | Wang | H01M 4/8621 429/469 |
| 2006/0216227 A1* | 9/2006 | Idem | B01J 21/066 423/651 |
| 2008/0014494 A1* | 1/2008 | Iordache | H01M 4/92 429/524 |
| 2008/0260607 A1* | 10/2008 | Flytzani-Stephanopoulos | B01J 23/63 422/222 |
| 2010/0148111 A1* | 6/2010 | Fuertes Miquel | B01J 23/10 252/62.2 |

FOREIGN PATENT DOCUMENTS

| | | |
|---|---|---|
| KR | 1020060039404 A | 5/2006 |
| KR | 1020100013146 A | 2/2010 |
| KR | 1020100069492 A | 6/2010 |

\* cited by examiner

ELECTRODE CATALYST FOR FUEL CELL, METHOD OF PREPARING THE SAME, AND MEMBRANE ELECTRODE ASSEMBLY AND FUEL CELL, EACH INCLUDING THE SAME

CROSS-REFERENCE TO RELATED APPLICATIONS

This application claims priority to and the benefit of Korean Patent Application No. 10-2012-0142317, filed on Dec. 7, 2012, and all the benefits accruing therefrom under 35 U.S.C. § 119, the content of which is incorporated herein in its entirety by reference.

BACKGROUND

1. Field

The present disclosure relates to an electrode catalyst for a fuel cell, a method of preparing the electrode catalyst, a membrane-electrode assembly ("MEA") including the electrode catalyst, and a fuel cell including the membrane-electrode assembly.

2. Description of the Related Art

According to a type of an electrolyte and fuel used, a fuel cell can be classified as a polymer electrolyte membrane fuel cell ("PEMFC"), a direct methanol fuel cell ("DMFC"), a phosphoric acid fuel cell ("PAFC"), a molten carbonate fuel cell ("MCFC"), or solid oxide fuel cell ("SOFC").

In general, a PEMFC and a DMFC include a membrane-electrode assembly ("MEA") including an anode, a cathode, and a polymer electrolyte membrane interposed between the anode and the cathode. The anode includes a catalyst layer for catalyzing the oxidation of a fuel, and the cathode includes a catalyst layer for catalyzing the reduction of an oxidant.

In general, the anode and the cathode contain catalysts including platinum (Pt) as an active component. However, Pt used in Pt-based catalysts is an expensive precious metal, and the amount of Pt used in the electrode catalysts is also high. Thus, for mass production and commercialization of fuel cells, cost reduction is desired.

Therefore, there is a demand for the development of an electrode catalyst that includes less Pt, and provides high electrochemical performance.

SUMMARY

Provided are an electrode catalyst for a fuel cell, the electrode catalyst having high catalyst activity, and a method of preparing the electrode catalyst.

Provided are a membrane-electrode assembly including the electrode catalyst, and a fuel cell including the membrane-electrode assembly.

Additional aspects will be set forth in part in the description which follows and, in part, will be apparent from the description.

According to an aspect, a fuel cell electrode catalyst includes an active complex including a cerium (Ce)-nitrogen (N) bond and having an oxygen reduction activity of at least about 0.1 milliampere per square centimeter at 0.4 volts versus a reversible hydrogen electrode.

The active complex may include a crystalline particle having a cerium-nitrogen bond.

Cerium in the cerium-nitrogen bond of the crystalline particle may have an oxidation number of 0 or 2+.

The crystalline particle may further include a cerium-oxygen bond, and cerium in the cerium-oxygen bond may have an oxidation number of 3+ or 4+.

The crystalline particle may have a same crystal lattice as that of a cerium oxide.

The crystalline particle may have an average particle diameter of about 5 nanometers (nm) or less.

The active complex may include a non-crystalline particle having a cerium-nitrogen bond.

The non-crystalline particle may be monomolecular.

Cerium in the cerium-nitrogen bond of the non-crystalline particle may have an oxidation number of 0 or 2+.

The active complex may further include at least one of a non-crystalline particle including cerium with an oxidation number of 0, and a non-crystalline particle including cerium with an oxidation number of 3+ or 4+.

Cerium in the active complex may be further complexed with at least one additional metal selected from among cobalt (Co), iron (Fe), copper (Cu), nickel (Ni), manganese (Mn), tungsten (W), and tin (Sn).

The electrode catalyst may further include a conductive support, and the active complex may be loaded on the conductive support.

According to another aspect, a method of preparing a fuel cell electrode catalyst includes: providing a pre-catalyst including a pre-active complex having a cerium-oxygen bond; and thermally treating the pre-catalyst in the presence of a nitrogen-containing material at a temperature of from about 700° C. to about 2000° C. to prepare the electrode catalyst, wherein the electrode catalyst includes an active complex including a cerium-nitrogen bond.

The pre-active complex may be a cerium oxide.

The temperature for the thermal treatment may be from about 1000° C. to about 1500° C.

The nitrogen-containing material may be selected from among a nitrogen gas, a $C_2$-$C_{30}$ heteroaromatic compound including at least one nitrogen atom, and a $C_1$-$C_{30}$ aliphatic compound including at least one nitrogen atom.

At least part oxygen of the cerium-oxygen bond in the pre-active complex may be substituted with a nitrogen atom during the thermally treating, to form the cerium-nitrogen bond in the active complex.

According to another aspect, a fuel cell membrane-electrode assembly includes: a cathode: an anode disposed opposite to the cathode; and an electrolyte membrane disposed between the cathode and the anode, wherein at least one of the anode and the cathode includes the above-defined electrode catalyst.

The cathode may include the electrode catalyst.

According to another aspect, a fuel cell includes the above-defined membrane-electrode assembly.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Figure 1:
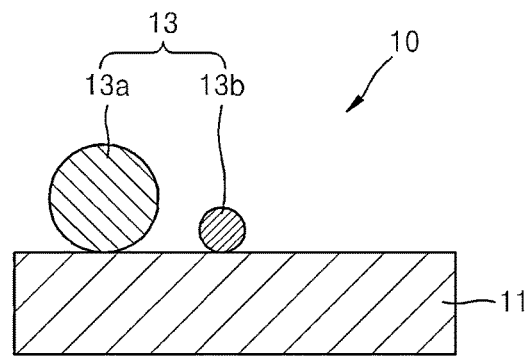
FIG. 1 is a schematic view of an embodiment of an electrode catalyst.

Reference will now be made in detail to embodiments, examples of which are illustrated in the accompanying drawings, wherein like reference numerals refer to the like elements throughout. In this regard, the present embodiments may have different forms and should not be construed as being limited to the descriptions set forth herein. Accordingly, the embodiments are merely described below, by referring to the figures, to explain aspects of the present description. As used herein, the term "and/or" includes any and all combinations of one or more of the associated listed items. "Or" means "and/or." Expressions such as "at least one of," when preceding a list of elements, modify the entire list of elements and do not modify the individual elements of the list.

It will be understood that when an element is referred to as being "on" another element, it can be directly on the other element or intervening elements may be present therebetween. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

"Oxidation number" refers to a formal oxidation number.

"Mixture" as used herein is inclusive of all types of combinations, including physical mixtures, blends, alloys, solutions, and the like.

"Aliphatic" means a saturated or unsaturated linear or branched hydrocarbon. An aliphatic compound may be a substituted or unsubstituted alkane, alkene, or alkyne, for example.

"Heteroaromatic" means a hydrocarbon group having an aromatic ring, and includes monocyclic and polycyclic hydrocarbons wherein the additional ring(s) of the polycyclic hydrocarbon may be aromatic or nonaromatic (e.g., phenyl or napthyl), in which at least one aromatic ring member (e.g., one, two or three ring members) is a heteroatom. The heteroatom(s) may be independently selected from nitrogen (N), oxygen (O), P (phosphorus), and sulfur (S).

According to an embodiment, a fuel cell electrode catalyst (hereinafter, also referred to as a "catalyst") includes an active complex comprising a cerium (Ce)-nitrogen (N) bond and having an oxygen reduction activity of at least about 0.1 milliampere per square centimeter (mA/cm$^2$), specifically about 0.2 to about 1 mA/cm$^2$, more specifically about 0.3 mA/cm$^2$ to about 0.8 mA/cm$^2$ at 0.4 volts (V) versus a reversible hydrogen electrode ("RHE"), or at least about 0.1 mA/cm$^2$, specifically about 0.2 to about 1 mA/cm$^2$, more specifically about 0.3 mA/cm$^2$ to about 0.8 mA/cm$^2$ at 0.6 V versus RHE. While not wanting to be bound by theory, it is understood that the cerium-nitrogen bond may contribute to the oxygen reduction activity of the active complex.

The active complex may comprise a crystalline particle having a cerium-nitrogen bond.

The cerium-nitrogen bond of the crystalline particle may be contained in a moiety represented by Formulas 1 and/or 2:

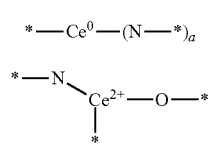

Formula 1

Formula 2

In Formulas 1 and 2, the symbol * indicates a binding site of an adjacent atom (for example, a cerium, nitrogen, or an oxygen atom) or an unshared electron. The number of adjacent atoms or unshared electrons in each of Formulas 1 and 2 may be 1 or greater, specifically 1 to about 8, more specifically about 2 to about 4. For example, the number of adjacent atoms or unshared electrons linked to $Ce^0$ in Formula 1 may be 1 or greater in number, which means that at least one adjacent element may be linked to, e.g., coordinated with, $Ce^0$ in Formula 1. In Formula 1, a may be an integer from 1 to 4, specifically 2 or 3.

In an embodiment, cerium in the cerium-nitrogen bond of the active complex may have an oxidation number of 0 or 2+. While not wanting to be bound by theory, it is understood that the high oxygen reduction activity is related to the oxidation number of the cerium in the crystalline particle being 0 or 2+.

The crystalline particle may further include a cerium-oxygen bond, e.g., a cerium-oxygen bond contained in a moiety of Formulas 3 or 4 below, in addition to the above-described cerium-nitrogen bond:

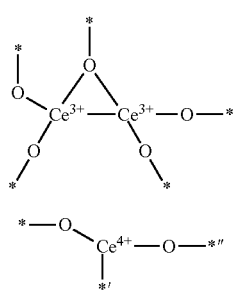

Formula 3

Formula 4

In Formulas 3 and 4, the symbol * indicates a binding site of an adjacent atom or an unshared electron. The number of adjacent atoms or unshared electrons in Formulas 3 or 4 may be 1 or greater, specifically 1 to about 12, more specifically about 2 to about 8.

In an embodiment, the crystalline particle may further include the moiety comprising the cerium-oxygen bond, and cerium in the cerium-oxygen bond may have an oxidation number of 3+ or 4+.

The crystalline particle may have the same crystal lattice as that of a cerium oxide, for example, $CeO_2$. Alternatively, the crystal lattice of the crystalline particle may have the same lattice as that of a cerium oxide in which at least one oxygen atom is substituted with a nitrogen atom.

A plurality of the crystalline particles may have an average particle diameter of about 5 nanometers (nm) or less, and in an embodiment, an average particle diameter of from about 0.1 nm to about 5 nm, specifically about 1 nm to about 4 nm. In another embodiment, a plurality of the crystalline particles may have an average particle diameter of from about 1 nm to about 5 nm, and in another embodiment, from about 3 nm to about 5 nm. Particle diameter may be determined by light scattering, for example. When the average particle diameter of the crystalline particle is within these ranges, the crystalline particle may have a large specific surface area, and thus provide high catalyst activity.

The active complex may also be in the form of a non-crystalline, i.e., amorphous, particle having a cerium-nitrogen bond. The non-crystalline particle may be amorphous. In an embodiment, the non-crystalline particle may be monomolecular.

The cerium-nitrogen bond of the non-crystalline particle may be contained in a moiety represented by Formula 1 or 2. That is, cerium of the cerium-nitrogen bond in the non-crystalline particle may have an oxidation number of 0 or 2+. While not wanting to be bound by theory, it is understood that the high oxygen reduction activity is related to the oxidation number of the cerium in the non-crystalline particle being 0 or 2+.

The non-crystalline particle may further include the cerium-oxygen bond contained in a moiety represented by Formula 3 or 4 above, in addition to the above-described cerium-nitrogen bond. In an embodiment, the non-crystalline particle may further include the cerium-oxygen bond, and cerium in the cerium-oxygen bond may have an oxidation number of 3+ or 4+.

In an embodiment, the active complex may further include at least one of a non-crystalline particle including cerium having an oxidization number of 0 and a non-crystalline particle including cerium having an oxidation number of 3+ or 4+. The non-crystalline particle including cerium having an oxidation number of 0 may be a non-crystalline particle including monomolecular cerium. The non-crystalline particle including cerium having an oxidation number of 3+ or 4+ may be a non-crystalline particle having the cerium-oxygen bond of Formula 3 or 4 above.

Cerium in the active complex may be further complexed (for example, alloyed) with at least one additional metal selected from among cobalt (Co), iron (Fe), copper (Cu), nickel (Ni), manganese (Mn), tungsten (W), and tin (Sn). When cerium is complexed with such an additional metal, the active complex may have improved characteristics, for example, in terms of lifetime.

In an embodiment, the active complex may include both the crystalline particle and the non-crystalline particle as described above.

The electrode catalyst may further include, in addition to the active complex, a conductive support. When the electrode catalyst further includes a conductive support, the active complex may be disposed on, e.g., loaded on, the conductive support. Accordingly, the electrode catalyst may have a larger specific surface area and improved conductivity. The conductive support may be a carbonaceous support.

The carbonaceous support may be selected from electrically conductive materials, and may comprise at least on selected from a metal and carbon. The metal may be any suitable metal, and may comprise at least one selected from tin, iron, molybdenum, and tungsten, for example. The carbon may comprise, for example, at least one selected from ketjen black, carbon black, graphitic carbon, carbon nanotubes, carbon fibers, mesoporous carbon, and graphene. These materials may be used alone or in a combination of at least two thereof.

When the electrode catalyst further includes such a conductive support, an amount of the active complex may be from about 20 parts to about 90 parts by weight, and in an embodiment, from about 30 parts to about 70 parts by weight, based on 100 parts by weight of the electrode catalyst including the active complex and the conductive support. When the relative amount of the active complex to the conductive support in the electrode catalyst is within these ranges, the electrode catalyst may have a large specific surface area and a high loading for improved catalytic activity.

FIG. 1 is a partial schematic view of an embodiment of an electrode catalyst 10. Referring to FIG. 1, the electrode catalyst 10 includes a conductive support 11 and an active complex 13. The active complex 13 may be disposed on the conductive support 11. The active complex 13 may include a crystalline particle 13a having a cerium-nitrogen bond, and a non-crystalline particle 13b having a cerium-nitrogen bond. The non-crystalline particle 13b may be monomolecular. The above-detailed description of the crystalline particle and non-crystalline particle may be referred to herein as description of the crystalline particle 13a and the non-crystalline particle 13b. While not wanting to be bound by theory, it is understood that because the crystalline particle 13a and the non-crystalline particle 13b have cerium-nitrogen bonds, the crystalline particles 13a and non-crystalline particles 13b may have a high oxygen reduction activity.

A method of manufacturing the fuel cell electrode catalyst, according to an embodiment, now will be described in further detail.

First, a pre-catalyst including a pre-active complex having a cerium-oxygen bond may be prepared.

The pre-active complex may be prepared from a cerium precursor, e.g., using a mixture including a cerium precursor. The cerium precursor may include at least one compound selected from a chloride, nitride, cyanide, sulfide, bromide, nitrate, acetate, sulfate, oxide, hydroxide, alkoxide, and a salt, each including cerium.

For example, the cerium precursor may comprise at least one compound selected from among, but not limited to, cerium nitride, cerium chloride, cerium sulfide, cerium acetate, cerium acetylacetonate, cerium cyanide, cerium isopropyl oxide, cerium nitrate, cerium butoxide, and $(NH_4)_xCe(NO_3)_y$, where $0<x\leq2$, and $0<y\leq6$, for example, x may be 2 and y may be 6.

To form the active complex of cerium to be further complexed with at least one metal selected from among cobalt (Co), iron (Fe), copper (Cu), nickel (Ni), manganese (Mn), tungsten (W), and tin (Sn), the mixture for preparing the pre-catalyst may further include, in addition to the cerium precursor, at least one metal precursor, e.g., at least one of a cobalt precursor, an iron precursor, a copper precursor, a nickel precursor, a manganese precursor, a tungsten precursor, and a tin precursor.

Non-limiting examples of the cobalt precursor, the iron precursor, the copper precursor, the nickel precursor, the manganese precursor, the tungsten precursor, and the tin precursor are compounds including at least one of a chloride, nitride, cyanide, sulfide, bromide, nitrate, acetate, sulfate, oxide, hydroxide, alkoxide, and salt, each including a corresponding metal, i.e., cobalt, iron, copper, nickel, manganese, tungsten, or tin.

The mixture for preparing the pre-catalyst may further include, in addition to the metal precursor as described above, a conductive support. When the mixture further includes a conductive support, the resulting electrode catalyst may include the conductive support and the active complex disposed on, e.g., loaded on, the conductive support.

The mixture for preparing the pre-catalyst may further include, in addition to the above-described metal precursor, a solvent for dissolving the metal precursor. Non-limiting examples of the solvent are glycolic solvents, such as ethyleneglycol, 1,2-propylene glycol, 1,3-butandiol, 1,4-butandiol, neopentyl glycol, diethyleneglycol, 3-methyl-1, 5-pentanediol, 1,6-hexanediol, and trimethylol propane; polymeric polyhydric alcohols such as polyvinyl alcohol; glycol ethers and polyalkylene glycol ethers such as methyl glycol, ethyl glycol, butyl glycol, diethylene glycol, triethylene glycol, tetraethylene glycol, higher polyethylene glycols, dipropylene glycol, tripropylene glycol, polypropylene glycol ether, and polybutylene glycol ether; aminated alcohols such as ethanolamine, propanolamine, isopropanolamine, hexanolamine, diethanolamine, diisopropanolamine, and dimethylethanolamine; aminated polyhydric alcohols and glycol ethers such as aminated polyethylene glycol; alcohols, such as primary and secondary alcohols such as methanol, ethanol, n-propanol, isopropylalcohol ("IPA"), and n-butanol, sec-butanol, pentanol, hexanol, 2-ethylhexanol, tridecanol, and stearyl alcohol; cyclic alcohols such as cyclohexanol, and cycloheptanol; aromatic alcohols such as benzyl alcohol, and 2-phenyl ethanol; and water. Any suitable solvent capable of dissolving the catalyst precursor may be used.

An amount of the solvent may be from about 15,000 parts to about 100,000 parts by weight, based on 100 parts by weight of the metal precursor. When the amount of the solvent is within this range, the metal precursor in the mixture may form a uniform metal alloy during a reduction reaction. In this regard, in the mixture further including a conductive support, the active complex may be more uniformly dispersed in the conductive support.

The mixture for preparing the pre-catalyst may further include a chelating agent (for example, ethylene diamine tetraacetic acid ("EDTA")) capable of reducing the metal precursor, a pH adjuster (for example, an aqueous NaOH solution), or the like.

The pre-catalyst may be prepared by reducing the metal precursor in the mixture. When the mixture for preparing the pre-catalyst includes a conductive support, a pre-catalyst including the pre-active complex disposed on the conductive support may be obtained.

The reducing of the metal precursor in the mixture may include contacting with at reducing agent, e.g., by adding a reducing agent into the mixture.

The reducing agent may be selected from materials able to reduce the metal precursor in the mixture. Non-limiting examples of the reducing agent include hydrazine $(NH_2NH_2)$, sodium borohydride $(NaBH_4)$, and formic acid. An amount of the reducing agent may be from about 1 mole to about 3 moles, based on 1 mole of the metal precursor. When the amount of the reducing agent is within this range, a satisfactory reduction reaction may be induced.

The reduction reaction of the metal precursor in the mixture may be performed at a temperature of from about 30° C. to about 80° C., and in another embodiment, from about 50° C. to about 70° C., which may depend upon the type and amount of the metal precursor.

The pre-active complex in the pre-catalyst may be a cerium oxide (for example, $CeO_2$). In an embodiment, the cerium in the pre-active complex may be further complexed with at least one additional metal selected from among cobalt (Co), iron (Fe), copper (Cu), nickel (Ni), manganese (Mn), tungsten (W), and tin (Sn).

After completion of the preparation of the pre-catalyst, the pre-catalyst may be thermally heated, e.g., heat treated, in the presence of a nitrogen-containing material to obtain a catalyst including an active complex having a cerium-nitrogen bond as described above.

Conditions for the thermal treatment may vary depending on the composition of the pre-catalyst, the type of the nitrogen-containing material, and the like. In an embodiment, the thermal treatment may be performed at a temperature of from about 700° C. to about 2000° C., for example, from about 700° C. to about 1500° C., for about 0.5 hour to about 10 hours, for example, for about 1 hour to about 4 hours. While not wanting to be bound by theory, it is understood that when the temperature and the time for the thermal temperature are within these ranges, substitution and/or inclusion of nitrogen in the pre-active complex of the pre-catalyst may be facilitated without causing structural damage to the pre-catalyst.

The nitrogen-containing material may be at least one selected from among a nitrogen gas, e.g., at least one selected from nitrogen, ammonia, and diazene, a $C_2$-$C_{30}$ heteroaromatic compound including at least one nitrogen atom (for example, pyridine, pyrimidine, triazine, pyrazine, quinoline, isoquinoline, pyrazole, triazole, and the like), and a $C_1$-$C_{30}$ aliphatic compound including at least one nitrogen atom (for example, $NH_2$—$CH_3$, $CH_3$—NH—$CH_3$, $CH_3$—$CH_2$—NH—$CH_3$, and the like). An embodiment in which the nitrogen-containing material is nitrogen gas, i.e., $N_2$, is specifically mentioned. Also specifically mentioned is an embodiment in which the aliphatic compound is a $C_1$-$C_{30}$ alkane having a nitrogen substitution.

In an embodiment, the nitrogen-containing material may be a nitrogen gas, but is not limited thereto. When a nitrogen gas, specifically nitrogen gas, is used as the nitrogen-containing material, a catalyst containing substantially zero residual impurity may be obtained through simple processes and at lower costs.

While not wanting to be bound by theory, it is understood that during the thermal treatment of the pre-catalyst, at least part of oxygen in the cerium-oxygen bond of the pre-active complex in the pre-catalyst may be substituted by nitrogen, resulting in the cerium-nitrogen bond in the active complex of the catalyst.

For example, when a pre-catalyst including $CeO_2$ as the pre-active complex is thermally treated in the presence of such a nitrogen-containing material as described above, at least part of oxygen in the pre-active complex (e.g., $CeO_2$) may be substituted by nitrogen, resulting in a catalyst including a Ce—ON active complex. The substitution of at least part of oxygen in $CeO_2$ by nitrogen does not cause collapse of the crystalline structure of the $CeO_2$ pre-active complex, so that the Ce—ON active complex as a final product may have the same crystal lattice as that of $CeO_2$.

According to another embodiment, a fuel cell membrane-electrode assembly ("MEA") includes a cathode and an anode that are disposed opposite to each other, and an electrolyte membrane disposed between the cathode and the anode, wherein at least one of the cathode and the anode includes the above-described electrode catalyst. In an embodiment, the electrode catalyst may be in the cathode.

The fuel cell may be implemented as, for example, a polymer electrolyte membrane fuel cell ("PEMFC"), a phosphoric acid fuel cell ("PAFC"), or a direct methanol fuel cell ("DMFC").

Figure 2:
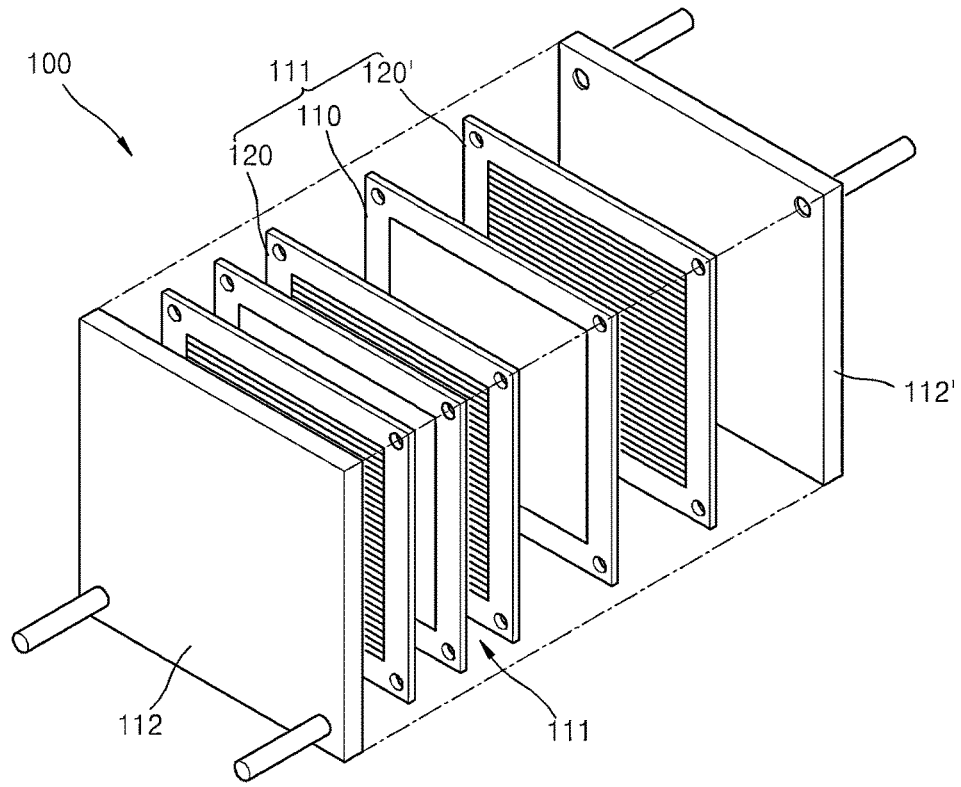
FIG. 2 is a perspective exploded view of an embodiment of a fuel cell.
Figure 3:
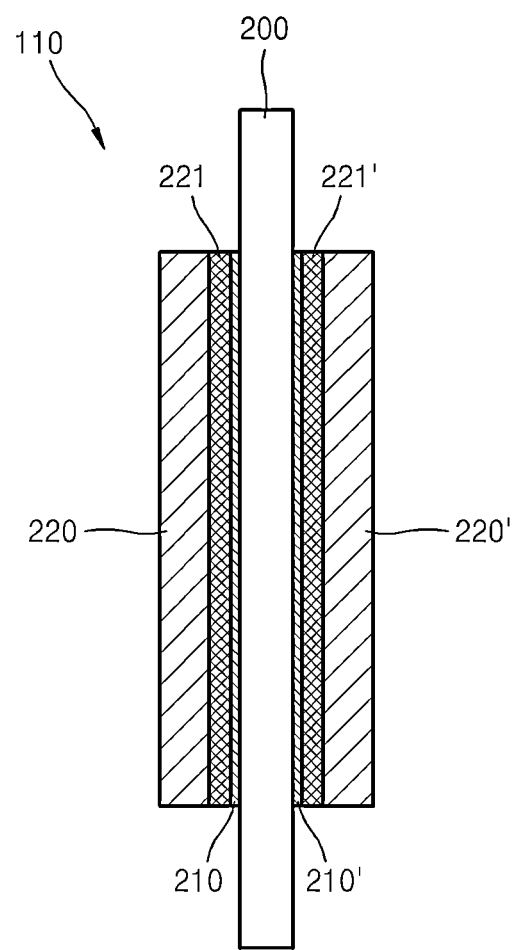
FIG. 3 is a cross-sectional diagram of an embodiment of a membrane-electrode assembly ("MEA") of the fuel cell of FIG. 2.

FIG. 2 is a perspective exploded view of a fuel cell 100 according to an embodiment. FIG. 3 is a cross-sectional diagram of a membrane-electrode assembly (MEA) forming the fuel cell 100 of FIG. 2.

Referring to FIG. 2, the fuel cell 100 includes two unit cells 111 that are supported by a pair of holders, first and second holders 112 and 112'. Each unit cell 111 includes an MEA 110, and first and second bipolar plates 120 and 120', respectively disposed on lateral sides of the MEA 110. Each bipolar plate 120 and 120' includes a conductive metal, carbon or the like, is effective as a current collector by being b bound to the MEA 110, and also supplies oxygen and fuel to catalyst layers of the MEA 110.

Although only two unit cells 111 are shown in FIG. 2, the number of unit cells is not limited to two and a fuel cell may have several tens or hundreds of unit cells, e.g., 1 to 1000 unit cells, depending on the desired properties of the fuel cell.

Referring to FIG. 3, each MEA 110 includes an electrolyte membrane 200; first and second catalyst layers 210 and 210' respectively disposed on either side of the electrolyte membrane 100 in the thickness direction thereof, one of the catalyst layers 210 and 210' including the electrode catalyst according to an embodiment; first and second primary gas diffusion layers 221 and 221' respectively stacked on the catalyst layers 110 and 110'; and first and second secondary gas diffusion layers 220 and 220' respectively stacked on the primary gas diffusion layers 221 and 221'.

The catalyst layers respectively 210 and 210' function as a fuel electrode and an oxygen electrode, each including a catalyst and a binder therein. The catalyst layers 210 and 210' may further include a material that may increase the electrochemical surface area of the catalyst.

The primary gas diffusion layers 221 and 221' and the secondary gas diffusion layers 220 and 220' may each comprise a material such as, for example, carbon sheet or carbon paper. The primary gas diffusion layers 221 and 221' and the secondary gas diffusion layers 220 and 220' diffuse oxygen and fuel supplied through the bipolar plates 120 into the surfaces of the catalyst layers 210 and 210'.

The fuel cell 100 including the MEA 110 may operate at a temperature of 100 to 300° C. Fuel such as hydrogen is supplied through one of the bipolar plates 120 into a first catalyst layer 210, and an oxidant such as oxygen is supplied through the other bipolar plate 120 into a second catalyst layer 210'. Then, hydrogen is oxidized into protons (H+) in the first catalyst layer 210, and the protons are conducted to the second catalyst layer 210' through the electrolyte membrane 200. Then, the protons electrochemically react with oxygen in the second catalyst layer 210' to produce water (H₂O) and generate electrical energy. Hydrogen produced from modification of hydrocarbons or alcohols may be used as fuel. Oxygen as an oxidant may be supplied in the form of air.

An embodiment will now be described in more detail with reference to the following examples. However, these examples are for illustrative purposes only and are not intended to limit the scope of the one or more embodiments.

EXAMPLES

Example 1

Synthesis of Pre-Catalyst

A carbonaceous support mixture including 0.5 gram (g) of Ketjen-Black (KB, 800 m²/g) dispersed in 100 g of H₂O was mixed with 1 molar (M) (NH₄)₂Ce(NO₃)₆ aqueous solution and 10.5 g of a 1M NaOH aqueous solution, and stirred for about 30 minutes to adjust a pH of the mixture to about 10 to 11, followed by adding a NaBH₄ aqueous solution for reduction to obtain a CeO₂ pre-active complex on the carbonaceous support. The resulting product was filtered, washed, and dried to prepare a CeO₂/C pre-catalyst containing 50 weight percent (wt %) (as a theoretical amount) of CeO₂ pre-active complex on the carbonaceous support.

Thermal Treatment of Pre-Catalyst

The pre-catalyst was put in an electrical furnace, and thermally treated at about 1400° C. for about 1 hour while supplying nitrogen (N₂) gas at about 3000 standard cubic centimeter per minute ("sccm"), to prepare a Ce—ON/C catalyst containing about 50 wt % (as a theoretical amount) of an active complex with Ce—N bonds on a carbonaceous support.

Example 2

A Ce—ON/C catalyst was prepared in the same manner as in Example 1, except that the thermal treatment for preparing the pre-catalyst was performed at about 1200° C.

Comparative Example 1

A Ce—ON/C catalyst was prepared in the same manner as in Example 1, except that the thermal treatment for preparing the pre-catalyst was performed at about 900° C., and hydrogen gas, instead of the nitrogen gas, was used.

Comparative Example 2

A catalyst was prepared in the same manner as in Example 1, except that a Co(NO₃)₂ aqueous solution, instead of the (NH₄)₂Ce(NO₃)₆ aqueous solution, was used in synthesizing the pre-catalyst.

Comparative Example 3

A catalyst was prepared in the same manner as in Example 1, except that a Fe(NO₃)₃ aqueous solution, instead of the (NH₄)₃Ce(NO₃)₆ aqueous solution, was used to synthesize the pre-catalyst.

Comparative Example 4

A catalyst was prepared in the same manner as in Example 1, except that a tantalum ethoxide solution, instead of the (NH₄)₃Ce(NO₃)₆ aqueous solution, was used in synthesizing the pre-catalyst.

Comparative Example 5

A catalyst was prepared in the same manner as in Example 1, except that a SmCl₄ aqueous solution, instead of the (NH₄)₂Ce(NO₃)₆ aqueous solution, was used in synthesizing the pre-catalyst.

Comparative Example 6

A catalyst was prepared in the same manner as in Example 1, except that the thermal treatment for preparing the pre-catalyst was performed at about 400° C.

Examples 1 and 2 and Comparative Examples 1 to 6 described above are summarized in Table 1 below:

TABLE 1

| Example | Pre-catalyst composition | Thermal treatment condition | Thermal treatment temperature | Catalyst composition |
|---|---|---|---|---|
| Example 1 | CeO₂/C[1] | nitrogen gas | 1400° C. | Ce—ON/C |
| Example 2 | CeO₂/C | nitrogen gas | 1200° C. | Ce—ON/C |
| Comparative Example 1 | CeO₂/C | hydrogen gas | 900° C. | CeO₂/C |
| Comparative Example 2 | CoO₂/C | nitrogen gas | 1400° C. | Co—(O)[2]N/C |
| Comparative Example 3 | FeO₂/C | nitrogen gas | 1400° C. | Fe—(O)N/C |
| Comparative Example 4 | TaO₂/C | nitrogen gas | 1400° C. | Ta—(O)N/C |
| Comparative Example 5 | SmO₂/C | nitrogen gas | 1400° C. | Sm—(O)N/C |
| Comparative Example 6 | CeO₂/C | nitrogen gas | 400° C. | CeO₂/C |

[1] "/C" indicates that the pre-active complex or active complex is loaded on a carbonaceous support.

[2] "(O)" indicates that presence of oxygen in the active complex is optional.

Figure 4:
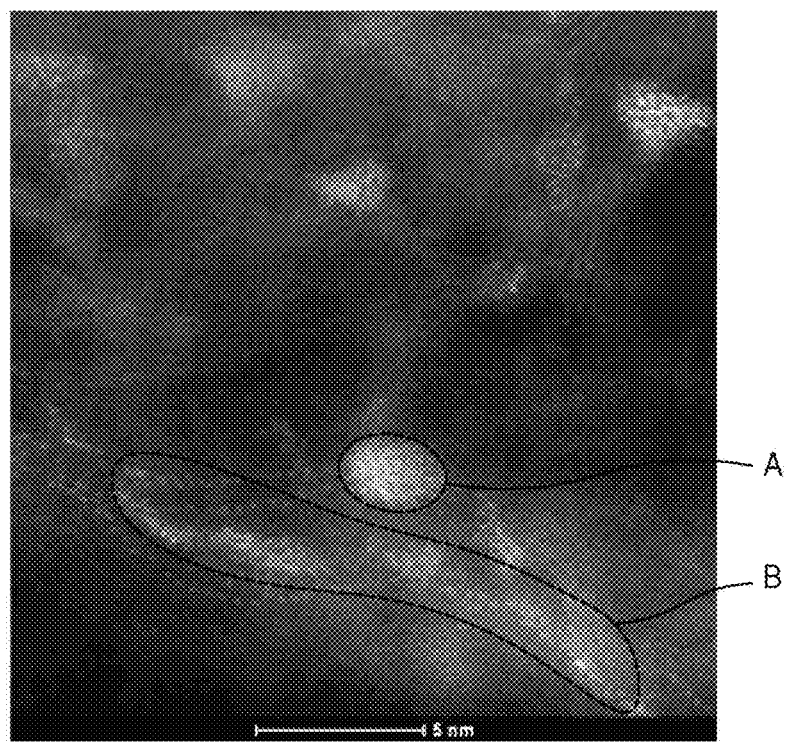
FIG. 4 is a high resolution scanning transmission electron microscope ("HR-STEM") image of a surface of an electrode catalyst of Example 1.

Evaluation Example 1: High-Resolution Scanning Transmission Electron Microscopy (HR-STEM) Analysis A surface of the catalyst of Example 1 was observed by high-resolution scanning transmission electron microscopy (HR-STEM). The results are shown in FIG. 4. Referring to FIG. 4, the active complex in the catalyst of Example 1 was found to include both crystalline particles, which are as delimited by a circle "A", and non-crystalline particles, which are delimited by a circle B. The non-crystalline particles may include cerium in atomic or molecular form.

Evaluation Example 2: X-Ray Diffraction ("XRD") Analysis

X-ray diffraction analysis was performed on the catalysts of Example 1 and Comparative Example 1 using an analyzer (MP-XRD, Xpert PRO, available from Philips/Power 3 kW). The results are shown in FIG. 5.

Figure 5:
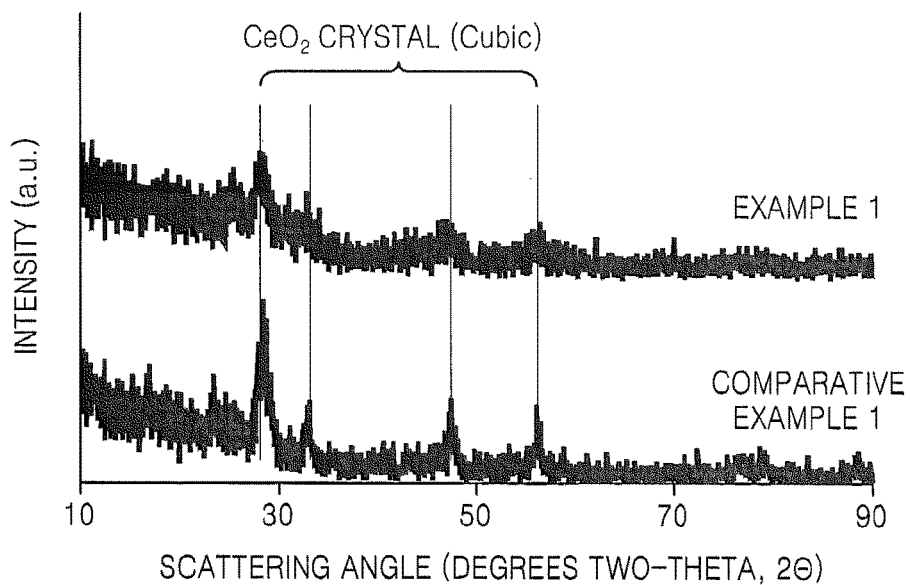
FIG. 5 is a graph of intensity (arbitrary units, a.u.) versus scattering angle (degrees two-theta, 2θ) which illustrates X-ray diffraction patterns of the electrode catalyst of Example 1 and an electrode catalyst of Comparative Example 1.

Referring to FIG. 5, both the catalysts of Examples 1 and Comparative Example 1 were found to have a crystal lattice structure of $CeO_2$.

Evaluation Example 3: X-Ray Photoelectron Spectroscopic ("XPS") Analysis

Figure 6:
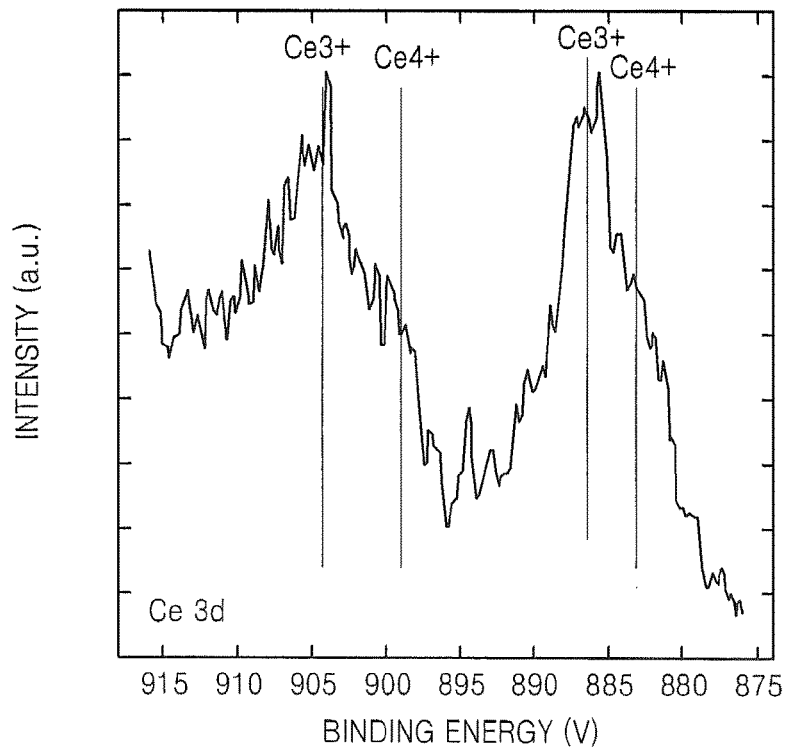
FIG. 6 is a graph of is a graph of intensity (arbitrary units, a.u.) versus binding energy (electron volts, eV) showing the results of X-ray photoelectron spectroscopy analysis of the electrode catalyst of Example 1.

X-ray photoelectron spectroscopic ("XPS") analysis was performed on the catalyst of Example 1, using an analyzer (Micro XPS, Quantom2000, available from Physical Electronics, Power=27.7 W, beam size=100 μm, and hV=1486.6 eV. The results are shown in FIG. 6. Atomic concentrations of elements in the catalyst obtained from the XPS analysis are shown in Table 2 below.

TABLE 2

| Example | Pre-catalyst | Thermal treatment condition | Thermal treatment temperature (° C.) | Catalyst | C1s (at %) | N1s (at %) | O1s (at %) | Ce3d (at %) | $Ce^{3+}/Ce^{4+}$ |
|---|---|---|---|---|---|---|---|---|---|
| Example 1 | $CeO_2$/C | nitrogen gas | 1400 | Ce—ON/C | 98.03 | 0.55 | 0.90 | 0.52 | 1.54 |
| Comparative Example 1 | $CeO_2$/C | hydrogen gas | 900 | $CeO_2$/C | 98.79 | 0.00 | 1.01 | 0.20 | 0.40 | at % stands for atomic percent.

Referring to FIG. 6 and Table 2, the catalyst of Example 1 was found to include nitrogen, while the catalyst of Comparative Example 2 included no nitrogen. The catalyst of Example 1 was also found to have a greater ratio of $Ce^{3+}/Ce^{4+}$ as compared with the catalyst of Comparative Example 1, indicating that more Ce was reduced than the catalyst of Comparative Example 1.

Evaluation Example 4: Oxygen Reduction Reaction ("ORR") Evaluation

About 15 μL of a mixture of 0.02 g of the catalyst of Example 1 with 10 g of ethylene glycol was dropped on a rotating glassy carbon electrode with a micropipette, and then dried at about 80° C. under reduced pressure, followed by dropping about 15 μL of a Nafion solution containing 5 wt % of ethylene glycol on the resulting product and driving in the same manner, thereby manufacturing an electrode.

The manufactured electrode was loaded as a working electrode onto a rotating disk electrode ("RDE") system, wherein a platinum (Pt) wire as a counter electrode and Ag/AgCl ($KCl_{sat}$) as a reference electrode were prepared. This 3-phase electrode was put in a 0.1 M $HClO_4$ electrolyte, and oxygen dissolved in the electrolyte was removed by bubbling with nitrogen for about 30 minutes. After saturating an electrolyte solution with oxygen using a potentiostat/gravanostat in a voltage range of about 0.03 to 1.2V (with respect to normal hydrogen electrode ("NHE")), while the carbon electrode was rotated, ORR currents were recorded in a negative direction from an open circuit voltage ("OCV") to a potential of about 0.4 to 0.6 V (with respect to NHE) at which a material limiting current occurs, to measure ORR activities.

ORR currents were recorded as above using the catalysts of Examples 2 and Comparative Examples 1 to 6, instead of the catalyst of Example 1. The results are shown in FIGS. 7 to 9.

Figure 7:
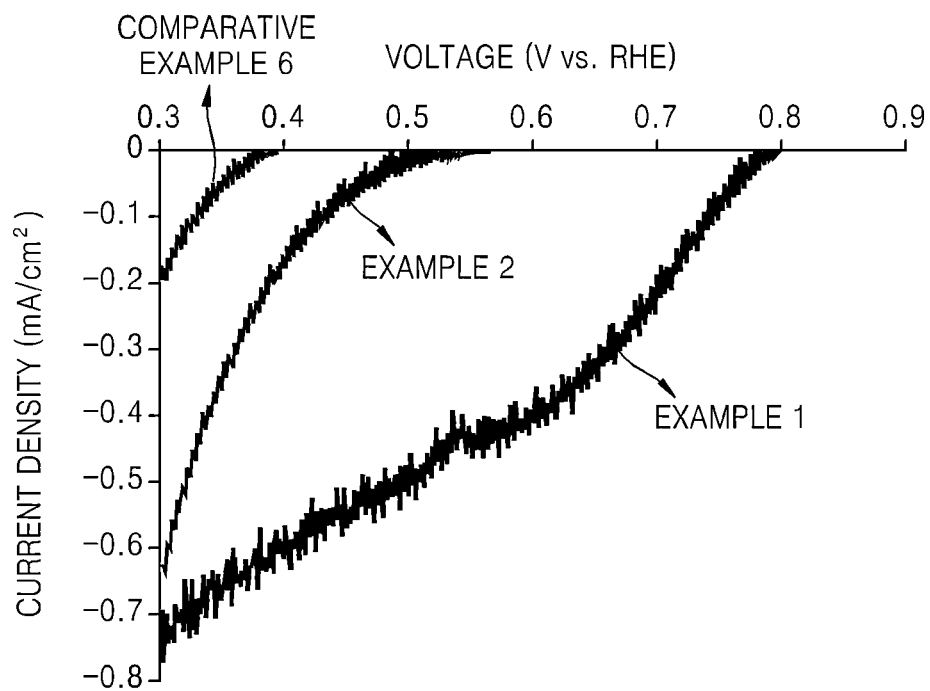
FIGS. 7 to 9 are graphs of current density (milliamperes per square centimeter, mA/cm$^2$) versus voltage (volts versus a reversible hydrogen electrode ("RHE")) illustrating the results of oxygen reduction reaction evaluation of the electrode catalysts of Examples 1 and 2 and Comparative Examples 1 to 6.
Figure 8:
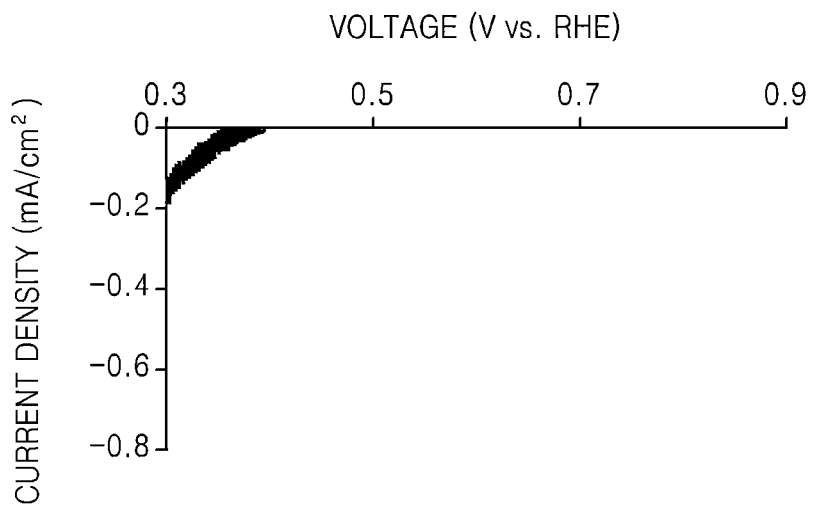
Figure 9:
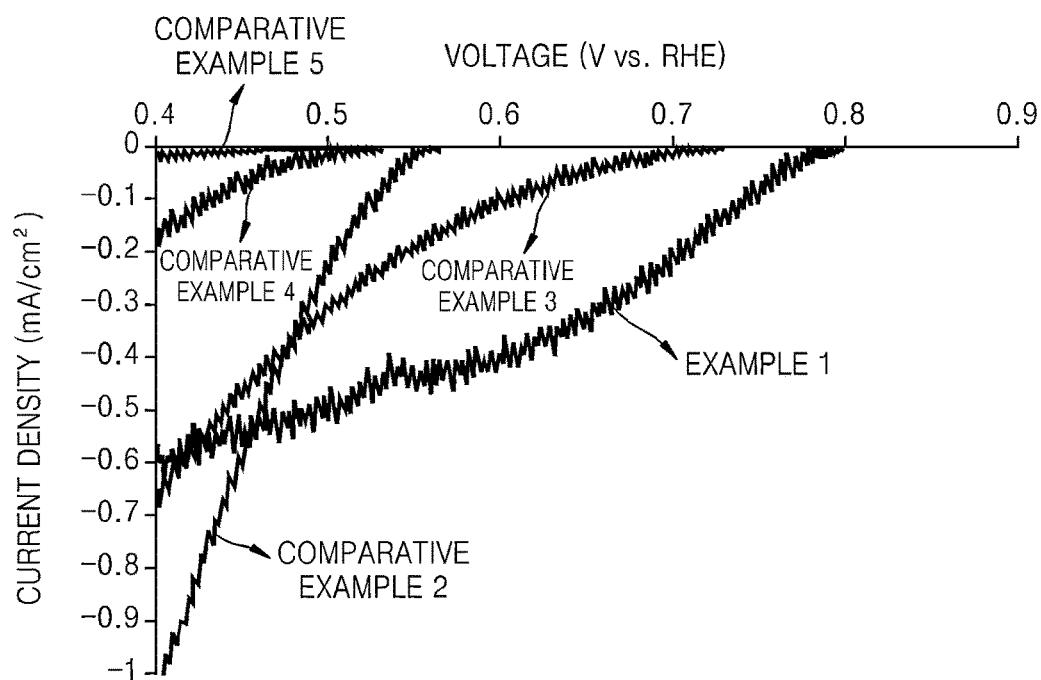

Referring to FIGS. 7 to 9, the catalysts of Examples 1 and 2 were found to have higher ORR activities as compared with the catalysts of Comparative Examples 1 to 6.

As described above, according to the one or more of the above embodiments, the electrode catalyst for fuel cells has high oxidation reduction activity, and thus may be used to manufacture a high quality fuel cell at lower cost.

It should be understood that the exemplary embodiments described herein should be considered in a descriptive sense only and not for purposes of limitation. Descriptions of features, advantages, or aspects within each embodiment should be considered as available for other similar features, advantages, or aspects in other embodiments.

What is claimed is:

1. A fuel cell membrane-electrode assembly, the membrane-electrode assembly comprising:
   a cathode;
   an anode disposed opposite to the cathode; and
   an electrolyte disposed between the cathode and the anode,
   wherein at least one of the anode and the cathode comprises a fuel cell electrode catalyst comprising an active complex comprising a cerium (Ce)-nitrogen (N) bond and having an oxygen reduction activity, wherein the active complex comprises a cerium-oxygen bond and cerium in the cerium-oxygen bond has an oxidation number of 3+ or 4+, and an atomic concentration ratio of nitrogen of the active complex to cerium obtained by X-ray photoelectron spectroscopic analysis is 1.06 or higher.

2. The membrane-electrode assembly of claim 1, wherein the active complex comprises a crystalline particle having the cerium-nitrogen bond.

3. The membrane-electrode assembly of claim 2, wherein the crystalline particle has a same crystal lattice as that of a cerium oxide.

4. The membrane-electrode assembly of claim 2, wherein the crystalline particle has an average particle diameter of about 5 nanometers or less.

5. The membrane-electrode assembly of claim 1, wherein the active complex comprises a non-crystalline particle having the cerium-nitrogen bond.

6. The membrane-electrode assembly of claim 5, wherein the non-crystalline particle is monomolecular.

7. The membrane-electrode assembly of claim 5, wherein cerium in the cerium-nitrogen bond of the non-crystalline particle has an oxidation number of 0 or 2+.

8. The membrane-electrode assembly of claim 1, wherein the active complex further comprises at least one of a non-crystalline particle including cerium with an oxidation number of 0, and a non-crystalline particle including cerium with an oxidation number of 3+ or 4+.

9. The membrane-electrode assembly of claim 1, wherein cerium in the active complex is further complexed with at least one additional metal selected from among cobalt (Co), iron (Fe), copper (Cu), nickel (Ni), manganese (Mn), tungsten (W), and tin (Sn).

10. The membrane-electrode assembly of claim 1, wherein the electrode catalyst further comprises a conductive support, and the active complex is loaded on the conductive support.

11. The membrane-electrode assembly of claim 1, wherein the cathode comprises the electrode catalyst.

12. A fuel cell comprising the membrane-electrode assembly of claim 1.

13. The membrane-electrode assembly of claim 1, wherein catalyst has an oxygen reduction activity of at least about 0.1 milliampere per square centimeter at 0.4 volts versus a reversible hydrogen electrode.

14. The membrane-electrode assembly of claim 1, wherein the catalyst has an atomic concentration of Ce3+/Ce4+ is 1.54.

15. A method of preparing a fuel cell electrode catalyst for a fuel cell membrane-electrode assembly the method comprising:
providing a pre-catalyst comprising a pre-active complex having a cerium-oxygen bond; and
thermally treating the pre-catalyst in the presence of a nitrogen-containing material at a temperature of from about 700° C. to about 2000° C. to prepare the electrode catalyst, wherein the electrode catalyst comprises an active complex comprising a cerium-nitrogen bond, and
wherein the active complex includes a cerium-oxygen bond, and cerium in the cerium-oxygen bond has an oxidation number of 3+ or 4+, and an atomic concentration ratio of nitrogen of the active complex to cerium obtained by X-ray photoelectron spectroscopic analysis is 1.06 or higher, and
the fuel cell electrode catalyst is comprised in at least one of an anode and a cathode of the fuel cell membrane-electrode assembly.

16. The method of claim 15, wherein the pre-active complex is a cerium oxide.

17. The method of claim 15, wherein the temperature for the thermal treatment is from about 1000° C. to about 1500° C.

18. The method of claim 15, wherein the nitrogen-containing material is selected from among a nitrogen gas, a $C_2$-$C_{30}$ heteroaromatic compound including at least one nitrogen atom, and a $C_1$-$C_{30}$ aliphatic compound including at least one nitrogen atom.

19. The method of claim 15, wherein the thermally treating comprises substituting an oxygen of the pre-active complex with a nitrogen atom during the thermally treating to form the cerium-nitrogen bond in the active complex.

\* \* \* \* \*